July 29, 1947.  B. H. BROWALL  2,424,913
LOAD-RESPONSIVE FLUID-PRESSURE BRAKE FOR VEHICLES
Filed Dec. 26, 1941  6 Sheets-Sheet 1

Inventor:
Bert Henry Browall
By: E. F. Wenderoth
ATTORNEY

Inventor:
Bert Henry Browall
By: E. F. Wenderoth
ATTORNEY

July 29, 1947.  B. H. BROWALL  2,424,913
LOAD-RESPONSIVE FLUID-PRESSURE BRAKE FOR VEHICLES
Filed Dec. 26, 1941  6 Sheets-Sheet 5
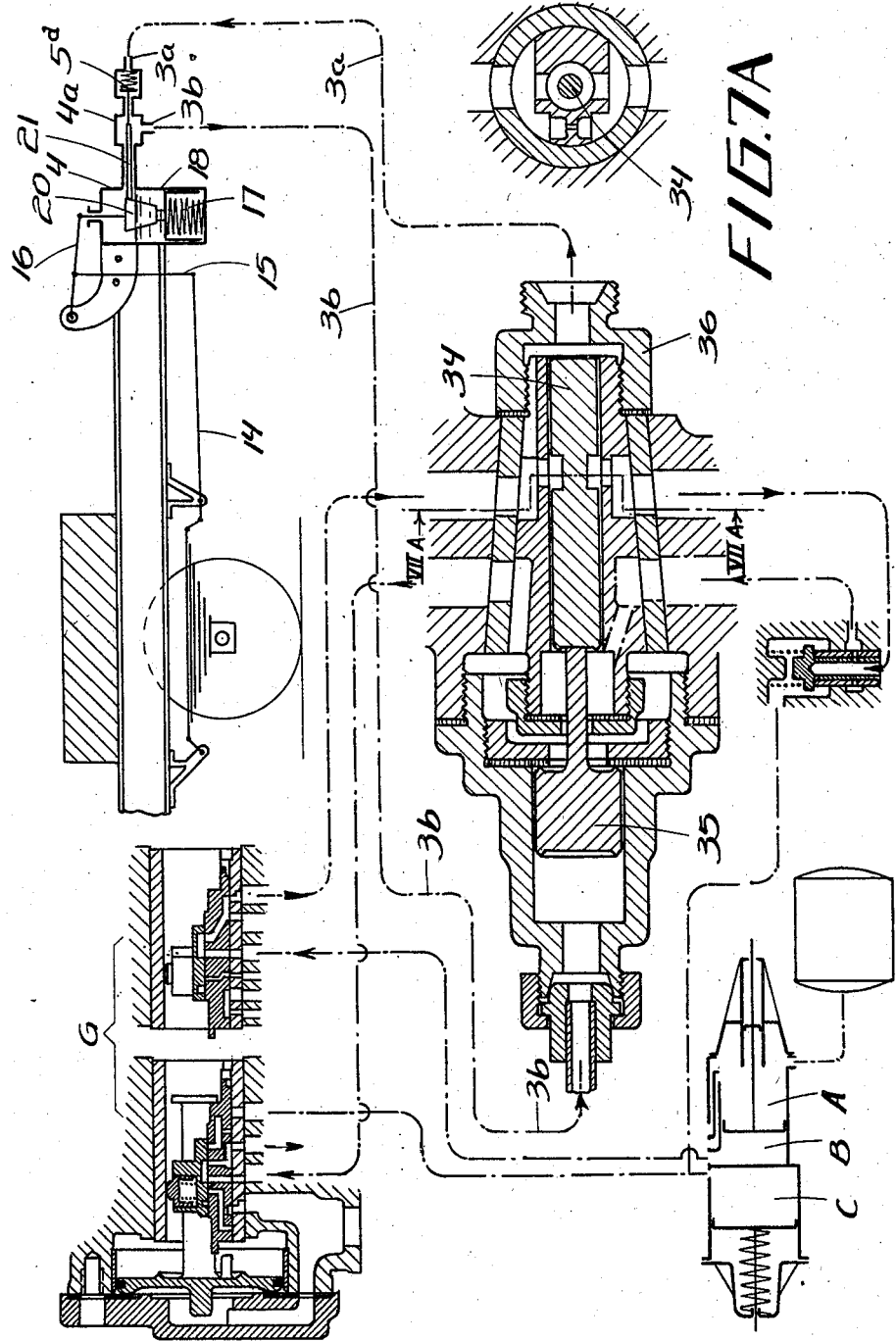
Inventor:
Bert Henry Browall
By: E. F. Wenderoth
ATTORNEY

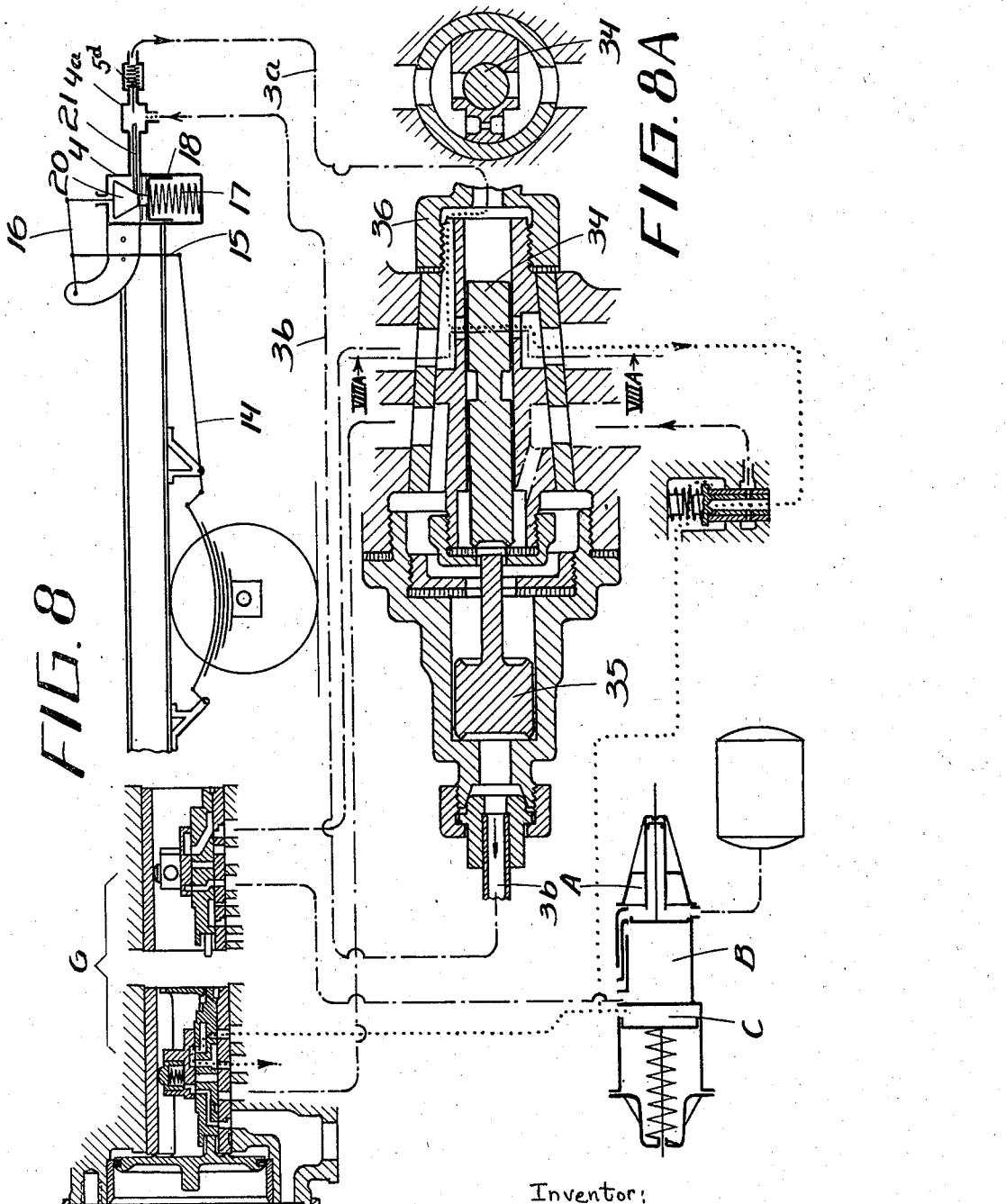

Patented July 29, 1947

2,424,913

UNITED STATES PATENT OFFICE 2,424,913

LOAD-RESPONSIVE FLUID-PRESSURE BRAKE FOR VEHICLES

Bert Henry Browall, Malmo, Sweden, assignor to Svenska Aktiebolaget Bromsregulator, Malmo, Sweden, a corporation of Sweden Application December 26, 1941, Serial No. 424,535
In Sweden November 27, 1940

8 Claims. (Cl. 188—195)

The present invention relates to fluid-pressure brakes for railway cars and similar vehicles, more particularly to fluid-pressure brakes of the types which are adjustable for a lower or a higher braking effort. In such brakes the higher braking effort is obtained for example by rendering a supplementary brake cylinder operative, or by setting the brake system for a higher brake cylinder pressure, or by setting the brake rigging for a higher brake applying leverage. It is well-known to carry out the setting operation for the lower or higher braking effort automatically under the control of means acting in response to the vehicle load when said load decreases below or increases above a certain value. For the automatic performance of the setting operation it is well-known to use a compressed-air servo motor to which air for the operation is supplied from the brake system through a valve device placed under the control of the means acting in response to the vehicle load. In the well-known constructions this valve device serves to connect the compressed-air servo motor either with the compressed-air source afforded by the brake system, or with the atmosphere, according to the position of the means acting in response to the vehicle load. Said means are adapted to be actuated either by the deflection of the supporting springs of the vehicle under the load thereof, or by a force which is derived from and proportional to the supporting spring pressure and acts against a spring or other resilient counter-force. In any case the valve device must be movable through said means between two setting positions, viz. one in which it connects the compressed-air servo motor along one path with the compressed-air source, and another in which it connects the compressed-air servo motor along another path with the atmosphere. The path of movement between these two setting positions cannot, for constructional reasons, be made of any short length but must have a certain size; hence the value which the vehicle load has to pass above and below for changing the setting of the brake from the lower to the higher braking effort position and vice versa does not become sharp but gets the character of a vehicle load range having a lower and an upper limit, setting to the higher braking effort position taking place only when passing above the upper limit, and resetting to the lower braking effort position taking place only when passing below the lower limit. For this reason the automatic setting device operates uncertainly in as much as, within said range, the brake one time may be set in the lower brake effort position and a second time in the higher braking effort position. This is a disadvantage which it was not hitherto possible to reduce otherwise than by reducing the path of movement between the two setting positions of the valve device and bringing the limits of said vehicle load range nearer together, which, however, met with constructional difficulties and, above all, involved the creation, or amplification, of a disadvantage of another and more serious kind. The nearer the said two limits were brought together, the greater was the risk that the rocking movements of the vehicle at the running would cause perpetual changes of the setting and a corresponding great consumption of compressed air, which might jeopardize the normal function of the brake system, e. g. cause fatigue of the brake.

The present invention has for its object to remove the above indicated disadvantages and difficulties, and it is generally characterized by the features that the valve device controlled in response to the vehicle load is provided in a conduit between the compressed-air servo motor and a point of the brake system which is immediately set under pressure upon application of the brake but from which the pressure disappears when the brake is released, and that the valve device is capable of shutting off the said conduit in one direction only, i. e. in the direction for preventing flow of compressed-air from the said point of the brake system to the servo motor. The valve device thus under all conditions permits a backflow of air from the compressed-air servo motor to the said point of the brake system at the disappearance of the pressure therefrom, irrespective of whether the valve device is open or closed for a flow of compressed air to the servo motor. For this purpose the valve device may comprise, in addition to an operable shut-off valve, an automatic return valve connected in parallel with the operable shut-off valve, or the latter valve may itself be so formed as to permit said return flow, for which purpose the valve may be made as an operable return valve.

Through this arrangement which makes possible a simple constructional form of the valve device, in the first place the advantage is obtained that the risk of air losses at repeated setting movements is eliminated, there being no outlet to the atmosphere. At the same time the advantage is obtained that the passing from either of the two braking effort positions to the other takes place practically at a single fully determined position of the valve, the two load limits above referred to having thus been brought to coincide as far as they depend upon the operation of the valve.

For illustrating the invention reference will be made to the accompanying drawings, in which Fig. 1 shows a form of the invention applied to a well-known fluid pressure brake system.

Fig. 2 shows another form of the invention applied to another well-known fluid pressure brake system, and Fig. 2A is a view of certain details, taken on line IIA—IIA in Fig. 2.

In both of these two forms the means acting in response to the vehicle load for controlling the valve device are actuated by the deflection, in proportion to the vehicle load, of the supporting springs of the vehicle.

Figure 5:
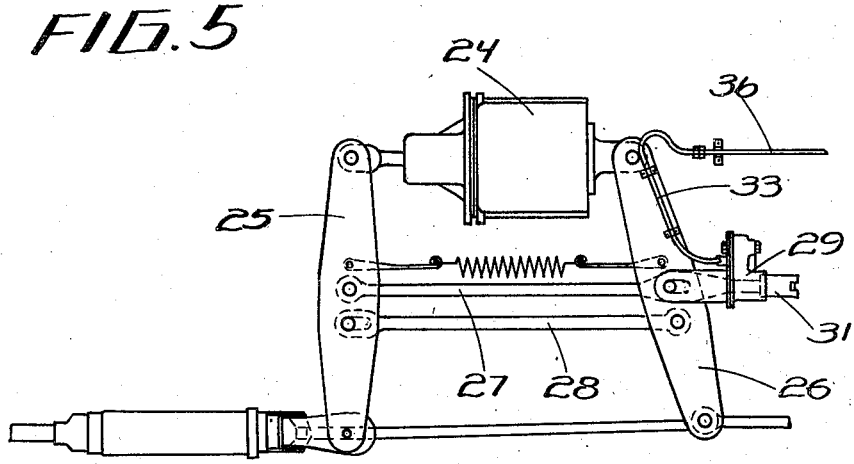

Fig. 5 diagrammatically shows, by way of example, how the compressed-air servo motor may be arranged and connected to the valve device, in case the setting of the brake for a lower or higher braking effort takes place by altering the leverage of the brake rigging by means of a so-called mechanical leverage switch.

Figure 6:
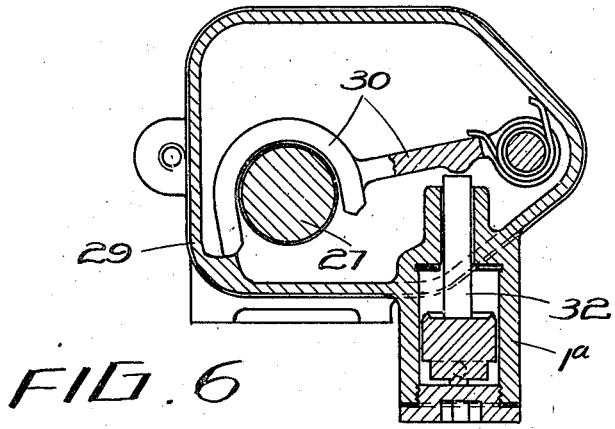

Fig. 6 shows, by way of example, in section through the leverage switch and the compressed-air servo motor serving to operate said switch how these means may be constructed and combined with each other.

Figs. 7, 7A and 8, 8A illustrate a particularly advantageous form of construction for the application of the invention to a well-known type of freight train brake, Fig. 7 showing how the device operates when braking is taking place at the higher braking effort stage, so called load braking, and Fig. 8 showing how the device operates at the release of the brake, and Figs. 7A and 8A being cross sections on the lines VIIA—VIIA in Fig. 7 and VIIIA—VIIIA in Fig. 8, respectively.

Figure 1:
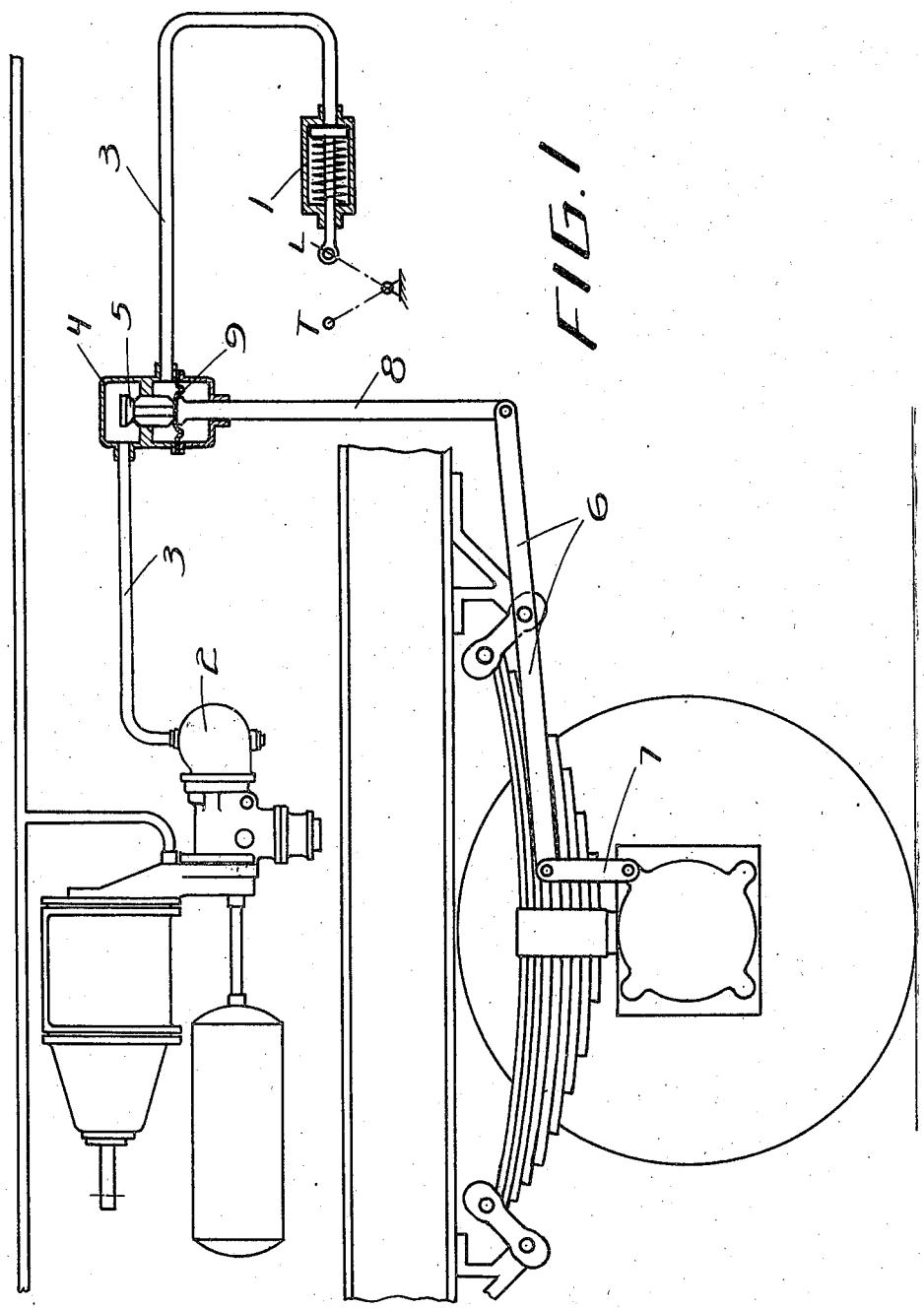

With reference first to Fig. 1, 1 designates a compressed-air servo motor which, according to whether it occupies the position marked L or that marked T, in any well-known manner not shown in this figure sets the brake for load braking or empty braking. The compressed-air servo motor may be of the ordinary type where the servo motor piston at the supply of compressed air is moved in its cylinder from its original position and is returned to this position by a spring force when the compressed air is allowed to escape from the servo motor cylinder. For applying operating air to the compressed-air servo motor, this is shown connected to the equalizing chamber or bulb 2 of the well-known type of brake shown, which chamber or bulb at the beginning of the braking operation is at once set under pressure but from which the pressure disappears at the release of the brake. In the connection 3 there is provided a valve device contained in a housing 4 and of a very simple construction, the valve member 5 thereof consisting of a simple automatic lift-valve which can lift from its seat and permit the escape of any compressed air in the compressed-air servo motor via the equalizing chamber 2 at the disappearance of the pressure therefrom upon release of the brake, but engages its seat and prevents compressed air from flowing in the opposite direction from the equalizing chamber 2 to the compressed-air servo motor 1 except when the valve is positively opened (lifted from its seat) by means which for this purpose act upon the valve only when the vehicle load is below a certain value, the so-called change-over load. In the positively opened condition of the valve 5 compressed air flows at once, when braking occurs, from the equalizing chamber 2 to the compressed air servo motor 1 and brings the latter into the position T, so that the braking operation will proceed as an empty brake application instead of as a load brake application. At the release of the brake the compressed air again escapes from the compressed-air servo motor 1 via the valve 5 and the equalizing chamber 2 due to the disappearance of the pressure from the latter. In the example under consideration the means acting in response to the vehicle load for actuating the valve 5 comprise a double-armed lever 6 which is pivoted on the vehicle frame or on a spring bracket provided thereon, and which at one end is coupled by means of a link 7 to an axle box and at the other end is connected with a valve lifting rod 8. Between this valve lifting rod 8 and the valve 5 a diaphragm 9 may be provided in the valve body to prevent compressed air losses by leakage.

The valve 5 has no intermediate position between closed and open positions, i. e. the valve is open as soon as lifted from its seat. For this reason the change-over load, i. e. the vehicle load value above which the valve remains non-actuated and below which the valve is actuated by the means 6, 7, 8 acting in response to the vehicle load, becomes relatively well-defined. In other words, the vehicle load range within which the setting device can set the brake now for empty braking, now for load braking, is very narrow and in fact practically confined within the limits imposed by friction in the setting device (in which, in the form of Fig. 1, also the supporting springs of the vehicle must be included). It is clear that when the vehicle load is equal or nearly equal to the change-over load, rockings and shocks during the running of the vehicle cause an unsteady action of the valve, so that this now opens, now cuts off the supply of compressed air to the servo motor when braking occurs. But this does not matter at all, for when the vehicle load is equal, or nearly equal, to the calculated change-over load it is quite allowable to perform the braking operation either as an empty braking or as a load braking. Whichever it be is of no account, since the vehicle load at or near the change-over load is still to be sufficient to permit load braking without running the risk of sliding the wheels. The consumption of compressed air is small, no compressed air being consumed by the setting device except when braking is taking place, and not even then as long as the valve 5, on account of the vehicle load conditions, is permitted to occupy closed position. If the valve is held in opened position by the means acting in response to the vehicle load, the compressed air consumption of the setting device will be limited, at each braking operation, to the small quantity which is required for a single complete movement of the servo motor piston from the end position normally occupied by it to the other end position, and this air consumption is not increased at repeated opening and closing operations of the valve. When the brake is off the device is not under pressure at all, and accordingly no compressed air consumption takes place in the device when the brake is off. Furthermore, as will be understood, compressed air losses by leakage are very easy to prevent in this device.

In Fig. 1 the arrangement is such that the servo motor in its initial position maintains the brake set for load braking. The arrangement may, however, also be made such that the servo motor in its initial position maintains the brake set for empty braking. Examples thereof are shown in the later figures.

It is preferable but not necessary that the valve to be operated by the means acting in response to the vehicle load is formed so as itself to act also as an automatic valve for permitting the escape of any compressed air in the servo motor via the point of connection thereof with the brake system at the disappearance of the pressure from this point upon release of the brakes. The last mentioned function can, as is exemplified in Fig. 2, be taken over by a special return valve which is connected in parallel with the valve to be operated by the means acting in response to the vehicle load; the latter valve may then be constructed for example as a slide valve or plug-cock, if desired.

Some other point of connection of the compressed-air servo motor to the brake system than the equalizing chamber of the type of brake selected by way of example in Fig. 1 may also be chosen. It must, however, always be kept in mind as a necessary condition that the point of connection is to be set under pressure at once upon application of the brake and that the pressure must vanish again from said point upon release of the brake. The disappearance of the pressure, however, need not necessarily take place immediately upon release of the brake; it is sufficient that the pressure has ceased when the brake is off.

Figure 2:
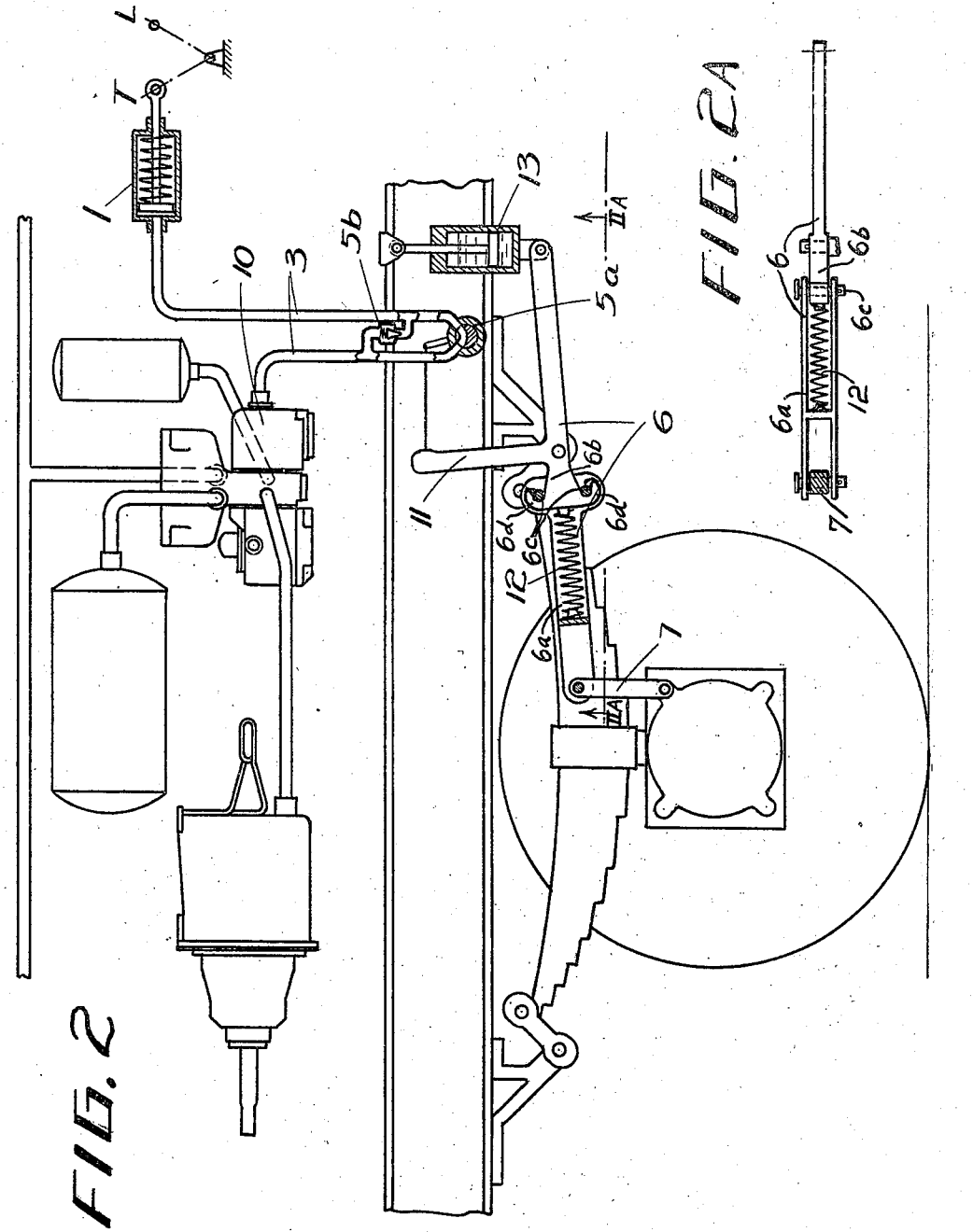

The form shown in Fig. 2 is an example of the application of the invention to another well-known type of brake. According to this example the compressed-air servo motor 1 is connected by means of the conduit 3 to the service valve 10 of the brake. The valve device provided in the conduit 3 in this example comprises a cut-off valve 5a formed as a plug-cock, and an automatic return valve 5b connected in parallel with the former. For operating the valve 5a there is in this case an angle arm 11 on the lever 6. The arm of the latter which is connected with the axle box through the link 7 is divided into two parts 6a, 6b articulated against the action of a compressed spring 12 in both directions in the plane of movement of the lever, and the other arm of the lever which is provided with the angle arm 11 is connected with a dash-pot 13 which, owing to the resilient articulation of the first mentioned lever arm, prevents or smooths the transmission of rocking movements between the car frame and the axle box to the arm 11 actuating the valve 5a. The spring 12 normally holds both of two bolts 6c on lever part 6a in engagement with two hooks 6d on lever part 6b, so that the two lever parts 6a and 6b can turn in relation to each other in one direction or the other about one or the other of the two bolts 6c against the action of the spring 12. The compressed-air servo motor is in this case shown adapted to maintain the brake set for empty braking in its initial position and to set the brake for load braking only if the valve 5a, upon application of the brake, is held open by the angle arm 11 due to the vehicle load exceeding the change-over load.

Figure 3:
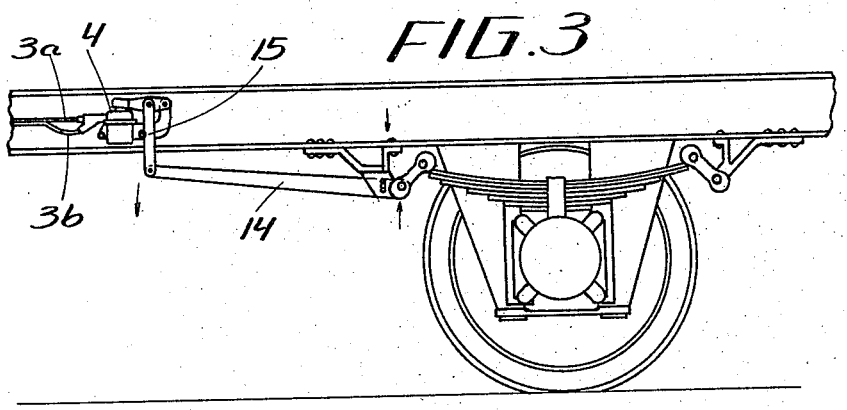
Fig. 3 illustrates, by way of example, the means serving to control the valve device when said means are adapted to be actuated by a force derived from, and proportional to the vehicle supporting spring pressure.
Figure 4:
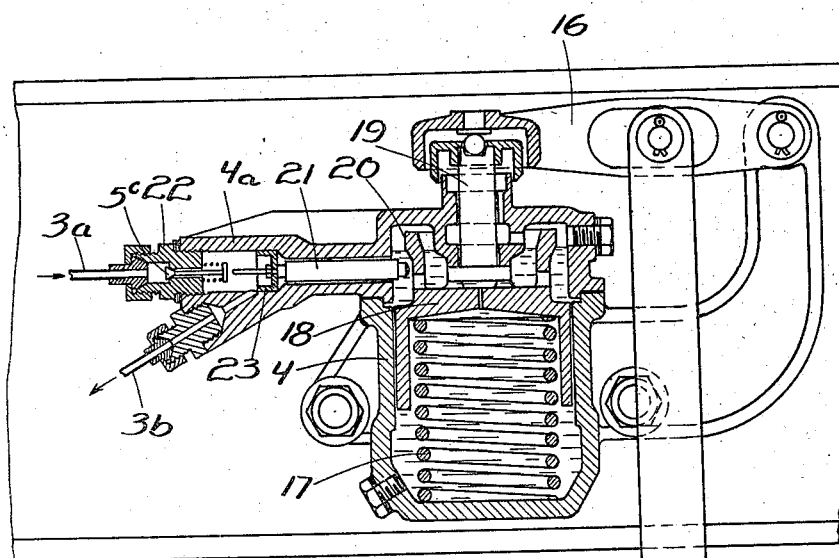
Fig. 4 illustrates, by way of example, partly from the side and partly in section how the valve device may be constructed.

Figs. 3 and 4 illustrate an example of the employment of a force derived from, and proportional to the vehicle supporting spring pressure for the operation of the valve 5c. The vehicle supporting spring acts through one of its suspension links on the shorter arm of a lever 14 with unequal arms which is fulcrummed on the car frame or on a bracket mounted thereon. The longer arm of the lever 14 engages, by means of a link 15, a lever 16 which rests against a spring 17 enclosed in the housing 4 through the intermediary of a piston 18 movable within the housing 4, and a slidable pin 19 provided between the piston 18 and the lever 16 and projecting up through the housing. In combination with fluid filled into the housing 4 the piston 18 acts as a dash-pot for smoothing rocking movements. The piston 18 is provided with a collar 20 or the like having an outer tapering cam surface for actuating a pin 21 which is guided in an extension 4a on the housing 4 and which in turn serves to actuate the valve 5c which is mounted in a nipple 22 screwed into the outer end of the extension 4a. To this nipple is connected a conduit 3a leading from a point of the brake system chosen according to the principles previously laid down. A diaphragm 23 mounted on the pin 21 is clamped in the extension 4a so as closely to shut off the air chamber in the outer portion of the extension 4a from the interior of the housing 4 which is filled with fluid. From the air chamber between the valve 5c and the diaphragm 23 in the extension 4a a conduit 3b extends to the compressed-air servo motor which in this case should be adapted in its initial position to maintain the brake set for the lower braking effort. When the vehicle load is increased above the change-over load, the piston 18 is pressed down against the action of the spring 17 so far that, by the cam surface on the collar 20, it moves the pin 21, so that this in turn actuates and opens the valve 5c which in this case preferably may be made substantially in the same manner as, or simply may consist of, a valve of the type used in an ordinary pneumatic automobile tire. When the valve is held open in this way, immediately upon application of the brake compressed air is supplied to the compressed-air servo motor, so that the latter sets the brake for the higher braking effort. In this form of construction the change-over load may conveniently be fixed at any desired value by a suitable choice of the point of engagement of the link 15 with the lever 16. For this purpose the point of engagement of the link 15 with the lever 16 may suitably be adjustable along the later.

Figs. 5 and 6 illustrate how, when using a so-called mechanical leverage switch (see U. S. Patent No. 2,081,660) for setting the brake for a lower or higher braking effort, said leverage switch and the compressed-air servo motor for setting the switch may be constructed and combined with each other, and how the compressed-air servo motor may be connected to the associated conduit for supplying operating air, viz. for example the conduit 3b in Figs. 3 and 4. Fig. 5 shows a conventional brake structure having two brake levers 25 and 26 associated with the brake cylinder 24, said levers being inter-connected by means of a so called empty rod 27 and a so called load rod 28. The higher braking effort is obtained by making the empty rod 27 inoperative, so that the braking operation is carried out through the load rod 28, i. e. with a higher brake applying leverage. The empty rod is made operative and inoperative by means of a leverage switch which in the example shown is carried on the dead brake lever 26 and is of the type disclosed in U. S. Patent No. 2,081,660. This leverage switch is contained in a housing 29 and includes an abutment 30 which is movable into and out of operative position for co-action with an abutment 31 on an extension of the empty rod 27 which slidably passes through the housing 29. The compressed-air servo motor 1a may, as shown, preferably have its cylinder made integral with the housing 29, the servo motor having a piston rod 32 projecting into the housing 29 for direct actuation of the movable abutment 30. The compressed-air servo motor is connected to the conduit 3b preferably by the intermediary of a flexible conduit or tube 33 which is suitably located to permit the movements of the servo motor together with and in relation to the dead brake lever 26.

In the application of the invention as shown in Figs. 7 and 8 to a well-known type of freight train brake the ordinary manually adjustable setting cock of the control valve of the brake is replaced by a plug-shaped non-rotatable body containing a slide valve which is adapted to occupy either of two end positions for empty and load braking, respectively, under the action of a compressed-air servo motor device controlled in response to the vehicle load. Because in Figs. 7 and 8 the brake cylinder with the various chambers A, B, C thereof, the control valve G, and the compressed-air servo motor device comprising the slide valve 34 and the special servo motor piston 35 do not per se form any part of the present invention, these means need not be described in detail herein. According to the present invention, the compressed-air supply conduit 3a, 3b leading to the end surface of the special servo motor piston 35 remote from the slide valve 34 contains a valve 5d such as has been described above and which is under the control of means acting in response to the vehicle load, while at the same time the said conduit 3a, 3b extends from a point of the brake system which is at once set under pressure upon application of the brake but from which the pressure vanishes upon release of the brake. In this case it is particularly suitable to take the compressed air from the space inside the cap nut 36, for which purpose the cap nut is provided with a screw-threaded portion for connecting it with the compressed-air conduit. In Figs. 7 and 8, the valve 5d and the means controlled thereby and acting in response to the vehicle load are shown diagrammatically in a construction which corresponds in principle to that shown in Figs. 3 and 4. In Figs. 7 and 8 the path of the compressed air to or from the servo motor piston 35 in the case of load braking or empty braking, respectively, is indicated by arrows. It will be seen from Fig. 8 that upon release of the brake the valve 5d, irrespective of the position of the means controlling it in response to the vehicle load, permits the escape of compressed air from the special servo motor piston 35 to the space inside the cap nut 36. The continued way of the compressed air from this space to the atmosphere is indicated in Fig. 8 by a dotted line.

(The parts designated by reference characters 4a, 17, 18, 20 and 21 in Figs. 7 and 8 may be identical in construction with the correspondingly designated parts shown in Figs. 3 and 4.)

An arrangement virtually corresponding to that above described and illustrated in Figs. 7 and 8 for the type of freight brake shown in these figures may be devised also for other types of freight brakes.

If there should not be a suitable point on the brake, fulfilling the conditions of the present invention, for the connection of the compressed-air servo motor, such a point may be provided, for example by arranging a channel in the control valve of the brake for this particular purpose in such a manner that upon application of the brake it is at once set under pressure but upon release of the brake is instead vented to the atmosphere.

What I claim and desire to secure by Letters Patent is:

1. In a fluid pressure brake system for vehicles, especially railway vehicles, having a member to be set into one or the other of two definite positions for conditioning the brake for a lower or higher braking effort preparatory to braking, the combination of means urging said member towards and normally holding it in one of its said two definite positions, a servo motor operable by fluid pressure for moving said member into and holding it in the other of its said two definite positions, a pressure fluid supply conduit for said servo motor connecting said servo motor to a point of the brake system, means for setting said point under fluid pressure immediately at the beginning of an application of the brake and for removing the fluid pressure from said point when the brake is released, valve means including a one-way valve and capable of shutting off said conduit only in the direction for preventing flow of pressure fluid from said point of the brake system to said servo motor, said one-way valve always permitting flow of pressure fluid from said servo motor to said point of the brake system, and means operating automatically under the influence of the load of the vehicle for controlling said valve means so as to cause said valve means to permit or prevent flow of pressure fluid from said point of the brake system to said servo motor as soon and as long as the vehicle load is on one side or the other respectively of a predetermined value.

2. In a fluid pressure brake system for vehicles, especially railway vehicles having a member to be set into one or the other of two definite positions for conditioning the brake for a lower or a higher braking effort preparatory to braking, the combination of means urging said member towards and normally holding it in one of its said two definite positions, a servo motor operable by fluid pressure for moving said member into and holding it in the other of its said two definite positions, a pressure fluid supply conduit for said servo motor connecting said servo motor to a point of the brake system, means for setting said point immediately under fluid pressure upon application of the brake and for removing the fluid pressure from said point when the brake is released; valve means comprising a lift-valve and a seat therefor in said conduit, said seat-valve being arranged to function as a one-way valve always permitting flow of pressure fluid from said servo motor to said point of the brake system, and means operating automatically under the influence of the vehicle load for positively lifting said lift-valve from its seat to permit flow of pressure fluid from said point of the brake system to said servo motor as soon and as long as the vehicle load is on one side of a predetermined value, said lift-valve being free to seat itself for preventing flow of pressure fluid from said point of the brake system to said servo motor as soon and as long as the vehicle load is on the other side of said predetermined value.

3. In a fluid brake system as claimed in claim 1, the additional feature that said valve means comprises a cut-off valve and an automatic return valve connected in parallel with said cut-off valve in said conduit so as to permit any pressure fluid in said servo motor to return to said point of the brake system as soon as the fluid pressure disappears therefrom on release of the brake, even if said cut-off value should be in closed position, said cut-off valve being adapted to be so controlled by said means operating automatically under the influence of the vehicle load that said cut-off valve permits or prevents flow of pressure fluid from said point of the brake system to said servo motor as soon and as long as the vehicle load is on one side or the other respectively of said predetermined value.

4. In a fluid pressure brake system for vehicles, especially railway vehicles, a fluid pressure servo motor for setting the brake for a lower or a higher braking effort according to the load of the vehicle, a pressure fluid supply conduit connecting said servo motor to a point of the brake system, means for setting said point immediately under fluid pressure upon application of the brake and for removing said fluid pressure from said point when the brake is released, a one way valve, means acting in response to the vehicle load for positively operating said one way valve to permit flow of pressure fluid from said point of the brake system to said servo motor only when the vehicle load is above a predetermined value so that if said one way valve is opened by movement of said load responsive means while the brakes are applied when loaded to the point where changeover occurs, said one way valve is opened between said servo motor and said point rather than to atmosphere, during application of the brakes.

5. In a fluid pressure brake system for railway vehicles having supporting springs, a fluid pressure servo motor for setting the brake for a lower or a higher braking effort according to the load of the vehicle, a pressure fluid supply conduit connecting said servo motor to a point of the brake system, means for setting said point immediately under fluid pressure upon application of the brake and for removing said fluid pressure from said point when the brake is released, valve means in said conduit, capable of shutting off said conduit in one direction only, namely in the direction for preventing flow of pressure fluid from said point of the brake system to said servo motor, and means responsive to the vehicle load for positively opening said valve means to permit flow of pressure fluid from said point of the brake system to said servo motor, comprising lever means for deriving from the vehicle supporting spring pressure a force proportional to said supporting spring pressure, a dash-pot comprising a liquid-containing housing and a piston movable therein and acted upon in one direction by said force derived from said spring supporting pressure, means for exerting a resilient counter-force on said piston in the other direction, and means operable by said piston for actuating said valve means.

6. In a fluid pressure brake system as claimed in claim 5, the additional feature that said lever means comprises a lever having two arms unequal in length, the shorter arm being connected to the vehicle spring by a hanger therefor, and a second lever coupled to the longer arm of said first lever and supporting itself against said piston.

7. In a fluid pressure brake system for railway vehicles, a fluid pressure servo motor piston, a slidable member mounted in axial alignment of said piston and movable by the aid thereof between two end positions in which the brake is set for a lower or a higher braking effort, respectively, a housing for said piston and slidable member, providing two spaces each facing one of the remote end surfaces of said slidable member and piston, means for providing connection between said spaces, including a valve device operable under the control of the vehicle load and capable of closing in one direction only, namely in the direction of preventing flow of pressure fluid from the space facing the end surface of said slidable member to the space facing the end surface of said piston, said space facing the end surface of said slidable member being so arranged in the brake system that it is set under fluid pressure immediately upon application of the brake but is relieved of such pressure when the brake is released.

8. In a fluid pressure brake system as claimed in claim 1 for railway vehicles having a frame, wheels, and springs for supporting the vehicle frame from said wheels, the additional feature that said valve means is operable under the control of the vehicle load by means comprising a lever which is pivoted to the vehicle frame and has one arm divided into two parts resiliently articulated in relation to each other in both directions in the plane of movement of the lever, means for imparting movement to one of said parts in dependence upon movements of the vehicle frame in relation to the wheels, and damping means connected to the other of said parts.

BERT HENRY BROWALL.

REFERENCES CITED

The following references are of record in the file of this patent:

UNITED STATES PATENTS

| Number | Name | Date |
|---|---|---|
| 2,179,399 | Browall | Nov. 7, 1939 |
| 2,081,660 | Carlbom | May 25, 1937 |
| 2,173,928 | Borde et al. | Sept. 26, 1939 |
| 2,155,226 | Renshaw | Apr. 18, 1939 |
| 843,481 | McCook | Feb. 5, 1907 |
| 2,251,267 | Carlbom | Aug. 5, 1941 |
| 2,169,629 | Browall | Aug. 15, 1939 |

FOREIGN PATENTS

| Number | Country | Date |
|---|---|---|
| 60,502 | Norway | Feb. 27, 1939 |
| 473,410 | Great Britain | Oct. 12, 1937 |